Jan. 30, 1945.　　　E. C. BROOKING　　　2,368,408
CARRIAGE CONTROL FOR LATHES
Filed Nov. 16, 1942　　2 Sheets-Sheet 1
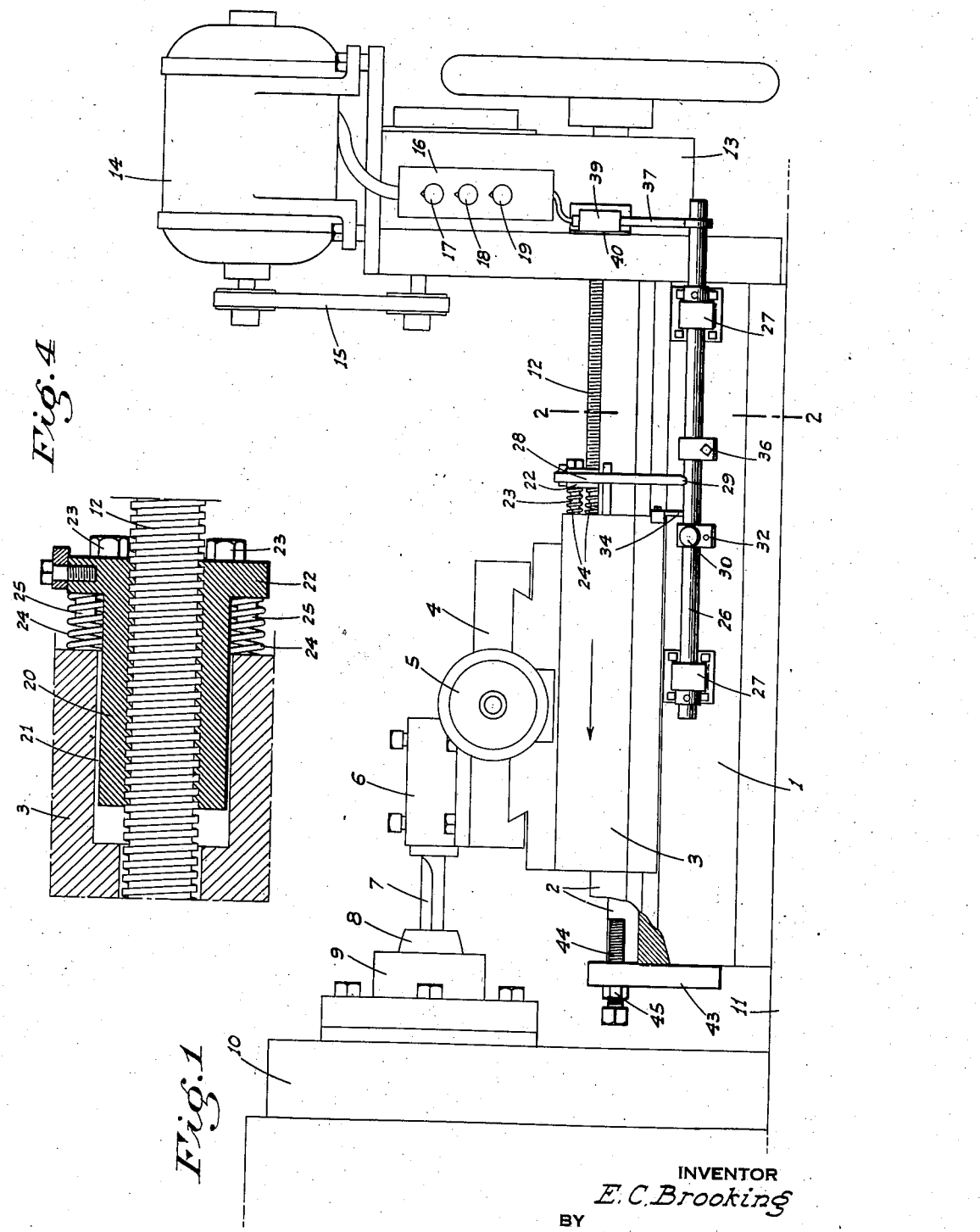
INVENTOR
E. C. Brooking
BY
ATTYS Jan. 30, 1945. E. C. BROOKING 2,368,408
CARRIAGE CONTROL FOR LATHES
Filed Nov. 16, 1942 2 Sheets-Sheet 2
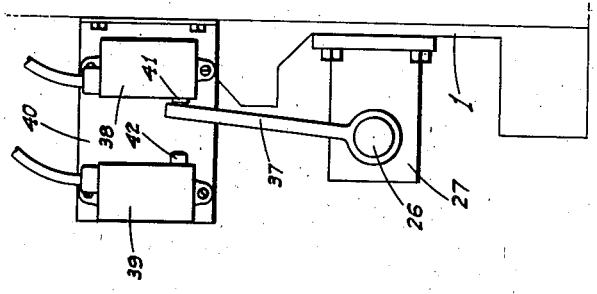
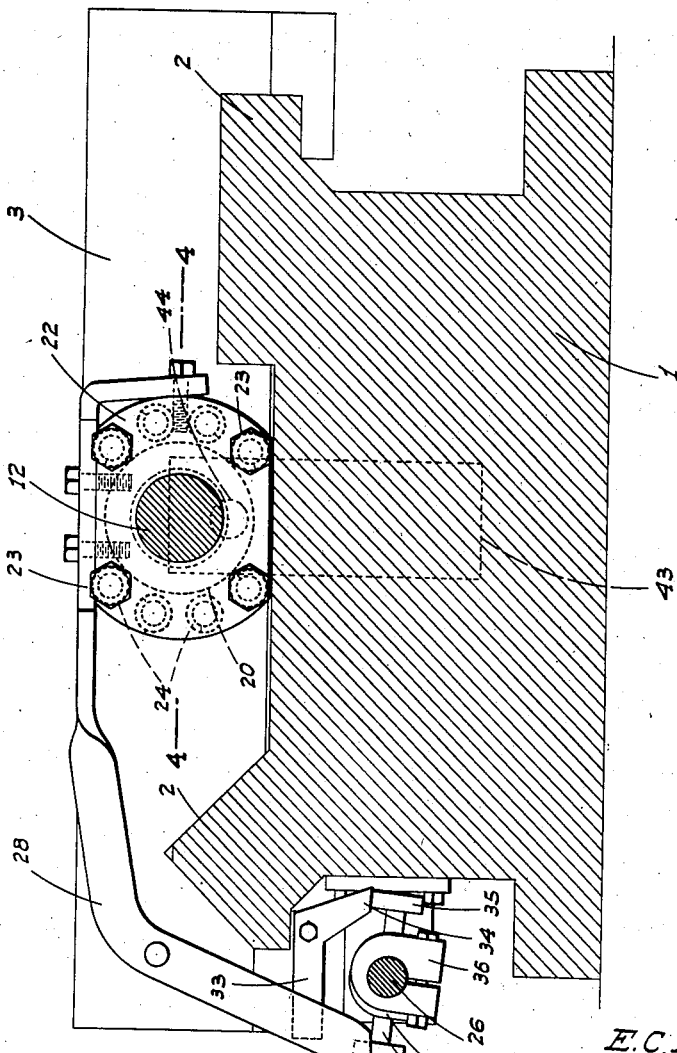
INVENTOR
E. C. Brooking
BY
ATTYS Patented Jan. 30, 1945

2,368,408

UNITED STATES PATENT OFFICE 2,368,408

CARRIAGE CONTROL FOR LATHES

Edgar C. Brooking, Toccoa, Ga., assignor to R. G. Le Tourneau, Inc., Stockton, Calif., a corporation of California Application November 16, 1942, Serial No. 465,647

15 Claims. (Cl. 82—21)

This invention relates in general to mechanism embodied in a machine lathe to automatically control movement of the carriage which supports, and advances or retracts, the work engaging tool.

One of the objects of the invention is to provide lathe carriage control mechanism which is operative to positively limit advancing movement of the carriage to an exact and predetermined point as is necessary where the tool must stop its advance at the same point on each piece of work in the lathe; the mechanism including means to automatically open the circuit of the electric drive motor after the carriage reaches said predetermined point.

Another object of the invention is to provide carriage control mechanism as in the preceding paragraph, which includes a compressible carriage advancing unit between the lathe feed screw and the carriage whereby upon positive limiting of advancing movement of the carriage, the feed screw can continue to rotate until the motor circuit is opened and the motor and drive gearing coasts to a stop.

A further object of the invention is to provide, in combination in a lathe, a carriage, a stop to limit advancing movement of the carriage, a motor-driven feed screw, and means between the carriage and feed screw operative to advance the carriage upon rotation of said screw in one direction and to permit of a certain amount of continued rotation thereof in said direction after the carriage engages said stop.

An additional object is to provide, in the combination recited in the preceding paragraph, a switch arranged to be opened to stop the motor, and a switch control assembly including a movable element disposed to one side of the feed screw clear of the carriage; said carriage advancing means including a nut on the feed screw, compression springs between said nut and the carriage; there being an arm projecting from said nut in position to engage and move said element of the switch control assembly.

It is also an object of the invention to provide lathe carriage control mechanism which includes one switch effective when opened to stop advance of the carriage, another switch effective when opened to stop retraction of the carriage, a switch control assembly operative to open either switch, and means functioning upon predetermined advance of the carriage to actuate said assembly to cause the latter to open said one switch, and functioning upon predetermined retraction of the carriage to actuate said assembly to cause the latter to open said other switch.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of a lathe embodying the carriage control.

Figure 2 is an enlarged cross section on line 2—2 of Figure 1.

Figure 3 is a fragmentary end view illustrating the stop switches as associated with the contact finger of the switch control assembly.

Figure 4 is a fragmentary sectional plan taken on line 4—4 of Fig. 2.

Referring now more particularly to the characters of reference on the drawings, the numeral 1 indicates the bed of the lathe; the top of said bed being formed with transversely spaced longitudinally extending ways 2 on which a horizontal carriage 3 is mounted for longitudinal sliding movement. As here shown, the carriage 3 supports a cross slide 4 controlled through the medium of a hand wheel 5. The cross slide supports a tool holder 6 and in which holder the tool 7 is secured; the tool projecting horizontally and longitudinally from the holder for engagement with the work 8 which is secured in a driven chuck 9 on the headstock of the lathe, indicated generally at 10. In the lathe on which the invention is here shown embodied, the bed 1 and the headstock are initially separate, being secured in fixed and somewhat spaced relation on a suitable base 11.

A horizontal feed screw 12 is disposed intermediate the ways and extends between the carriage 3 and a gear box 13 mounted in connection with and upstanding from the bed 1 of the lathe. The feed screw 12 is driven selectively in one direction or the other from the gear box 13, said gear box being driven by a reversible electric motor 14 connected to said gear box by means of a pulley and belt unit, indicated generally at 15. The motor is actuated by a circuit which includes a switch assembly 16 having switch control buttons 17, 18 and 19 which provide a manual control to actuate the motor to advance the carriage, or retract the carriage, or stop the motor, selectively.

A feed screw nut 20 is threaded on the feed screw at the rear end of the carriage 3, said nut being elongated and cylindrical with the forward portion of the nut projecting into a symmetrical socket 21 in the carriage. The rear or outer end of the elongated nut 20 is formed with a radial flange 22. A plurality of circumferentially and symmetrically spaced, headed bolts 23 project through the flange 22 in relative sliding relation thereto and are threaded into the rear end of the carriage; the shanks of bolts 23 being of such length that when the flange 22 is in engagement with the head of said bolts there is a substantial space between the other face of said flange and the adjacent end of the carriage.

A plurality of heavy duty compression springs 24 are disposed in spaced relation and normally under some compression between the flange 22 and the adjacent end of the carriage. Some of the springs are on the bolts, and escape of the remainder of said compression springs is prevented by relatively short guide studs 25 which project horizontally from flange 22 into the adjacent end of said springs. The springs 24 normally maintain the flange 22 in engagement with the heads of bolts 23.

A horizontal shaft 26 is journaled on one side of the bed 1 in a plane below the ways 2; the journals for said shaft being indicated generally at 27. The shafts extend from a point below the gear box 13 to a point beyond the point of furthermost forward travel of the rear end of the carriage. An arm 28 is rigidly secured on the flange 22 of the feed screw nut 20 and extends therefrom laterally and thence downwardly to a termination at its lower end adjacent and laterally out from the shaft 26. The lower end portion of arm 28 is formed as a cam 29 and is adapted to engage and depress a head 30, carried on a stem 31 projecting laterally out from a split block 32 clamped at a selected position on shaft 26. The carriage at its rear end is likewise fitted with a member 33 which includes a cam portion 34 disposed laterally in from shaft 26 and adapted to engage and depress a similarly mounted head 35 projecting laterally in from another split block 36 secured on shaft 26 rearwardly of split block 32 a distance substantially equal to the travel of the carriage for any given work.

At the end adjacent the gear box 13 the shaft 26 is fitted with an upstanding radial finger 37 which projects between a pair of standard microswitch boxes 38 and 39 respectively, mounted in spaced relation laterally of the lathe on a backboard 40 which is secured to and projects laterally from said gear box. The switch boxes 38 and 39 include push buttons 41 and 42 which the upper end of the finger 37 is adapted to selectively engage and depress with rotation of shaft 26 in one direction or the other. The switch boxes 38 and 39 are wired into the motor control circuit so that depression of the push button 42 opens the circuit of the motor when the motor is running in a direction to advance the carriage, while depression of push button 41 opens the circuit of the motor when the motor is running in a direction to retract the carriage.

The forward end of the bed is provided with a fixed bracket 43 which projects vertically upward between the longitudinal planes of the ways to a point above the bottom of the carriage; a horizontal longitudinally extending stop screw 44 being threaded through said bracket and secured in place by a lock nut 45.

Operation

In operation, the stop screw 44 is set to engage the forward end of the carriage when the tool 7 has engaged with the work the desired distance, so that on subsequent work of like kind the advance of the tool will always be positively limited to a predetermined point.

To advance the carriage from retracted position, the operator presses button 17 which causes the motor 14 to drive the feed screw in the proper direction. When the carriage has advanced to the limit of its travel, as determined by the position of stop screw 44, the feed screw 12 nevertheless continues to rotate, and the feed screw nut 20 to advance. This latter advance, however, is relatively short and is possible by reason of the fact that springs 24 compress and permit such movement.

After the carriage has engaged the stop screw and the feed screw nut has continued with such relatively short advance, the arm 28 engages and depresses the head 30, rotating the shaft 26 in a direction to swing finger 37 into engagement with and to depress push button 42 on switch box 39. With depression of push button 42 the motor is stopped.

To retract the carriage, the operator pushes button 18, which causes the motor 14 to drive the feed screw 12 in a carriage retracting position. As bolts 23 limit separation of the feed screw nut 20 from the carriage, the carriage is retracted with said nut. After the carriage has been retracted the desired distance and sufficient to withdraw the tool 7 from the work, the cam portion 34 of member 33 engages and depresses head 35. This rocks the shaft 26 in a direction to swing finger 37 into depressing engagement with push button 41 of switch box 38. When push button 41 is depressed the motor is stopped and the lathe is then ready for the above described cycle to be repeated.

The clamping blocks 32 and 36 are of course adjustable lengthwise of shaft 26 in order to position heads 30 and 35 at the proper point lengthwise of the lathe.

By employing compressible means between the feed screw nut and the carriage, it is possible to mechanically and positively stop advance of the carriage at an exact predetermined point, and yet use switch control mechanism which does not require any great exactness or nicety of adjustment. Furthermore, in many gear box and feed screw mechanisms there is a tendency for the feed screw to coast somewhat after the motor is off, and the compressible means between the feed screw nut and carriage permits this coasting without damage to the machine, and which would otherwise occur when the carriage engaged the stop screw 44.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. Carriage control mechanism for a lathe which includes a bed, a carriage mounted for movement along the bed, a driven feed screw, and means connecting the feed screw with the carriage to advance or retract said carriage with rotation of said feed screw in one direction or the other, respectively; said carriage control mechanism comprising a stop element mounted in connection with the bed of the lathe, the carriage being adapted to engage said stop element after predetermined advancing movement; said connecting means between the feed screw and the carriage including a feed screw nut threaded on the feed screw, and a compression spring engaged between said feed screw nut and the carriage.

2. A device as in claim 1 including means to limit axial separating movement of the feed screw nut and the carriage.

3. A device as in claim 1 including means to limit axial separating movement of the feed screw nut and the carriage, said limiting means comprising a headed bolt extending parallel to the feed screw and threaded into the adjacent end of the carriage, the feed screw having a portion thereof slidably surrounding the shank of said headed bolt.

4. Carriage control mechanism for a lathe which includes a bed, a carriage mounted for movement along the bed, a driven feed screw, and means connecting the feed screw with the carriage to advance or retract said carriage with rotation of said feed screw in one direction or the other, respectively; said carriage control mechanism comprising a stop element mounted in connection with the bed of the lathe, the carriage being adapted to engage said stop element after predetermined advancing movement; said connecting means between the feed screw and the carriage comprising a feed screw nut, a radial flange on the feed screw nut clear of the adjacent end of the carriage, a plurality of compression springs engaged between said flange and said end of the carriage, and means to limit relative separating movement of the feed screw nut and the carriage.

5. A device as in claim 4 including locating and guide pins projecting from the feed screw nut flange into the compression springs.

6. Carriage control mechanism for a lathe which includes a bed, a carriage slidably mounted on the bed, a motor driven feed screw, and means connecting the feed screw with the carriage to advance or retract the carriage with rotation of the feed screw in one direction or the other, respectively; said carriage control mechanism comprising a stop element fixed in position to positively limit advancing movement of the carriage to an exact predetermined point, a switch mounted on the lathe and arranged when actuated to stop the motor, and feed screw actuated means functioning after engagement of the carriage with said stop element to actuate said switch; said connecting means between the feed screw and the carriage being arranged to permit of a certain amount of continued rotation of the feed screw in said one direction.

7. Carriage control mechanism for a lathe which includes a bed, a carriage slidably mounted on the bed, a motor driven feed screw, and means connecting the feed screw with the carriage to advance or retract the carriage with rotation of the feed screw in one direction or the other, respectively; said carriage control mechanism comprising a stop element fixed in position to positively limit advancing movement of the carriage to an exact predetermined point, a switch mounted on the lathe and arranged when actuated to stop the motor, a horizontal shaft journaled along one side of the bed, a finger upstanding from the shaft, said switch being disposed adjacent said finger for actuation thereby, and feed screw actuated means functioning after engagement of the carriage with said stop element to rotate said shaft and move said finger in a direction to actuate said switch.

8. In a lathe which includes a carriage, a stop element positioned to engage the carriage and limit advancing movement thereof, a motor driven feed screw for the carriage, means connecting the feed screw with the carriage to permit of a certain amount of rotation of said feed screw in a carriage advancing direction after engagement of the carriage with said stop element, and feed screw actuated means to stop the motor after the carriage engages said element.

9. A device as in claim 8 in which said connecting means includes a feed screw nut; and said motor stopping means includes an arm projecting laterally of the lathe from said nut, a horizontal shaft journaled on the lathe adjacent the outer end of said arm, means on said shaft positioned for engagement by said arm, and functioning when so engaged, to rotate said shaft in one direction, a radial finger fixed on said shaft, and a motor shut-off switch mounted in position to be actuated by said finger upon rotation of the shaft in said direction.

10. In a lathe having a bed and a carriage slidable thereon, a feed screw, a feed screw nut, a compression spring mounted between the feed screw nut and the carriage, means to limit relatively separating movement of the feed screw nut and said carriage, a reversible electric motor connected in driving relation with said feed screw, a pair of motor shut-off switches, one switch being arranged to shut off the motor when advancing the carriage and the other switch being arranged to shut off the motor when retracting the carriage, a stop mounted to limit advancing movement of the carriage, and means operative to actuate said one switch after forward movement of the carriage is so limited, and to actuate said other switch after the carriage retracts a predetermined distance.

11. A device as in claim 10 in which said last named means comprises a horizontal shaft journaled on the bed clear of the carriage and feed screw, an arm secured on the feed nut and projecting to a point adjacent said shaft, a member fixed on the carriage and extending to adjacent the shaft, the ends of said arm and said member adjacent the shaft being formed as cams, a pair of cam engaging elements fixed on the shaft, the arm cam being adapted to engage one of said elements and rotate the shaft in one direction after the advancing movement of the carriage is so limited and the member cam being adapted to engage the other of said elements and rotate the shaft in the other direction upon retraction of the carriage said predetermined distance, and a radial finger mounted on said shaft; said finger projecting between said switches actuating said one switch when the shaft is rotated by the arm cam and actuating said other switch when the shaft is actuated by the member cam.

12. In a lathe having a bed and a carriage slidable thereon, a feed screw, a feed screw nut, compressible means mounted between the feed screw nut and the carriage, means to limit relative separating movement of the feed screw nut and said carriage, a reversible electric motor connected in driving relation with said feed screw, a pair of motor shut-off switches arranged to shut off the motor when the latter is advancing the carriage or when retracting the carriage, selectively, a stop element mounted to positively limit advancing movement of the carriage, and means to actuate said one switch after forward movement of the carriage is so limited, and to actuate said other switch after said carriage retracts a predetermined distance.

13. Carriage control mechanism for a lathe which includes a slidably mounted carriage, a motor, a feed screw driven by the motor and connected with the carriage to advance the latter with the rotation of the screw, means to positively stop the carriage at a predetermined point in its advance, means to permit the screw to continue to rotate after the carriage has stopped, a movable control element operative to stop the motor, and feed screw advanced means separate from the carriage and operative to engage and move said element after the carriage has engaged the stop.

14. Carriage control mechanism for a lathe which includes a slidably mounted carriage, reversible drive means, a feed screw driven by the drive means and connected with the carriage to advance the latter with the forward turning movement of the screw and to retract the carriage with the backward turning movement of such screw, means to positively stop the carriage at a predetermined point in its advance, means to permit the screw to continue its forward turning movement after the carriage has stopped, means including separate movable control elements adapted to stop said drive means when the screw has been rotated a certain predetermined amount in either direction respectively, screw advanced means separate from the carriage and operative, with the forward turning movement of the screw, to engage one of said elements after the carriage has been stopped, and means on the carriage to engage and move the other element when the screw is turned in the other direction and has retracted the carriage a predetermined distance.

15. Carriage control mechanism for a lathe which includes a slidably mounted carriage, a feed screw connected with the carriage to advance or retract the same upon rotation of said screw in one direction or the other, reversible drive means for said feed screw, means including separate movable control elements adapted to stop said drive means upon predetermined advance and retraction respectively of the carriage, feed screw advanced means separate from the carriage operative to engage and move the corresponding one of said elements upon said predetermined advance of the carriage, and means on the carriage to engage and move the other of said elements upon said predetermined retraction of the carriage; there being a fixed stop positioned to engage and positively stop the carriage upon said predetermined advance thereof, and means between the feed screw and carriage operative to permit of limited continued rotation of the feed screw after the carriage engages said stop.

EDGAR C. BROOKING.